United States Patent [19]

Iwasaki et al.

[11] Patent Number: 5,394,160
[45] Date of Patent: Feb. 28, 1995

[54] PORTABLE RADIO WITH COPLANAR GROUND AND ATENNA CONDUCTIVE FILMS FORMED ON THE INNER SURFACE OF THE CASE

[75] Inventors: Hiroyuki Iwasaki; Yukio Yokoyama, both of Tokyo, Japan

[73] Assignee: NEC Corporation, Tokyo, Japan

[21] Appl. No.: 940,453

[22] Filed: Sep. 4, 1992

[30] Foreign Application Priority Data

Sep. 4, 1991 [JP] Japan ............... 3-253148

[51] Int. Cl.[6] ............ H01Q 1/24; H01Q 1/38
[52] U.S. Cl. ............ 343/702; 343/767; 343/841
[58] Field of Search ............ 343/702, 769, 846, 767, 343/841; H01Q 1/24, 1/38

[56] References Cited

U.S. PATENT DOCUMENTS

| | | | |
|---|---|---|---|
| 4,625,212 | 11/1986 | Oda et al. | 343/702 |
| 4,721,962 | 1/1988 | Gorzel | 343/702 |
| 4,924,237 | 5/1990 | Honda et al. | 343/702 |
| 5,079,559 | 1/1992 | Umetsu et al. | 343/702 |

FOREIGN PATENT DOCUMENTS 39842 4/1978 Japan ............... 343/702

*Primary Examiner*—Michael C. Wimer
*Attorney, Agent, or Firm*—Ostrolenk, Faber, Gerb & Soffen

[57] ABSTRACT

In a portable radio communication apparatus comprising an insulating case having an inner surface and a printed board housed in the insulating case, an antenna conductive film is coated on a predetermined region of the inner surface of the insulating case. A conductive ground film is coated on the remaining region of the inner surface of the insulating case with a constant gap from the outer periphery of the antenna. A first conductive member connects the antenna film with the conductive ground film. A plurality of second conductive members connect the conductive ground film with a ground pattern of a radio communication circuit on the printed board. A feeding member connects the antenna with an antenna terminal pad of the radio communication circuit. The second conductive members and feeding member are conductive rods.

4 Claims, 2 Drawing Sheets

PORTABLE RADIO WITH COPLANAR GROUND AND ATENNA CONDUCTIVE FILMS FORMED ON THE INNER SURFACE OF THE CASE

BACKGROUND OF THE INVENTION

The present invention relates to a portable radio communication apparatus and, in particular, to a structure of a case including an antenna and an electromagnetic shield in such a portable radio communication apparatus.

A conventional portable radio communication apparatus comprises a printed board implemented with a radio communication circuit including a ground pattern and an antenna terminal pad for connecting to an antenna member, a shield case covering the printed board, the antenna member supported on an outer surface of the shield case and electrically connected to the antenna terminal pad, and an insulating case housing the shield case and the printed board.

The shield case has a top surface, a recessed surface, and a connecting surface between the top surface and the recessed surface. The antenna member with a predetermined length and width is fixedly supported on the recessed surface by a conductive supporting member and is away from the connecting surface. A feeding member is connected to the antenna member at one end. The feeding member has an opposite end which serves as a feeding point. This feeding point is connected to the antenna terminal pad on the printed board by an inner conductor of a coaxial cable. An outer conductor of a coaxial cable connects the shield case to the ground pattern on the printed board.

According to the structure of the conventional apparatus as described above, since the shield case is inserted into the mold case, the mold case and the shield case must be designed and produced with a predetermined clearance therebetween. Thus, it is difficult to make the apparatus small in size. In addition to this, the number of parts which form the apparatus increase.

This makes the apparatus large in size and weight and high in cost.

SUMMARY OF THE INVENTION

It is therefore an object of this invention to provide a portable radio communication apparatus which is small in size and weight and low in cost.

On describing the gist of this invention, it is possible to understand that a portable radio communication apparatus comprises an antenna, an insulating case having an inner surface, a printed board having a radio communication circuit including a ground pattern and an antenna terminal pad.

According to this invention, the above-described portable radio communication apparatus is characterized by an antenna being a conductive film coated on a predetermined region of the inner surface of the insulating case, conductive ground film coated on the remaining region of the inner surface of the insulating case with a constant gap from the outer periphery of the antenna conductive film, first conductive member connecting the antenna with the conductive ground film, a plurality of second conductive members connecting the conductive ground film with the ground pattern, and feeding member connecting the antenna conductive film with the antenna terminal pad.

DESCRIPTION OF THE PREFERRED EMBODIMENT

Figure 1:
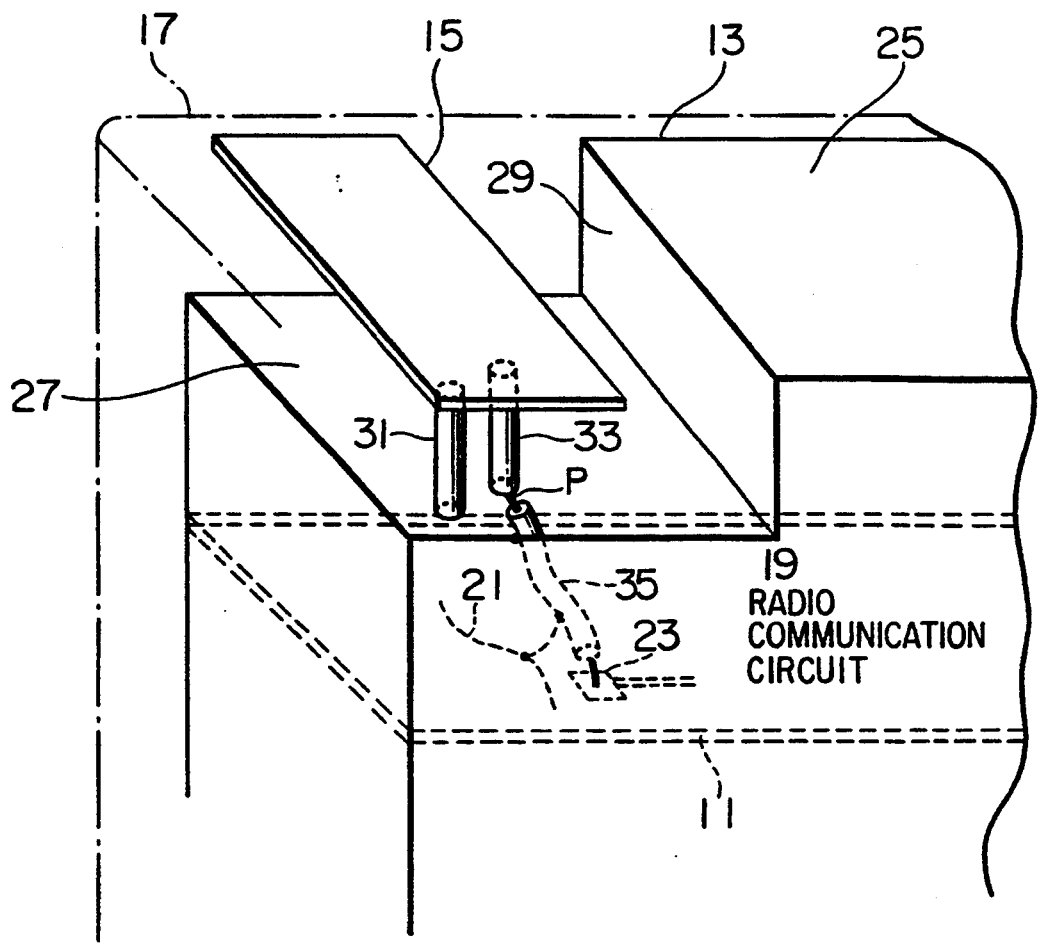
FIG. 1 is a partial perspective view of a conventional portable radio communication apparatus.

Referring to FIG. 1, a conventional portable radio communication apparatus will be described for a better understanding of this invention. The portable radio communication apparatus comprises a printed board 11, a shield case 13, an antenna member 15, and an insulating case 17. The printed board 11 having a radio communication circuit 19 including a ground pattern 21 and an antenna terminal pad 23. The shield case 13 contains the printed board 11 and electromagnetically shields the printed board 11. The shield case 13 has a top surface 25, a recessed surface 27 and a connecting surface 29 between the top surface 25 and the recessed surface 27. The antenna member 15 has a predetermined length and width and is fixedly supported by a conductive supporting member 31 on the recessed surface 27 of the shield case 13 but away from the connecting surface 29. A feeding member 33 is connected to the antenna member 15 at one end and has an opposite end which serves as a feeding point P. This feeding point P is connected to the antenna terminal pad 23 on the printed board 11 by an inner conductor of a coaxial cable 35. An outer conductor of the coaxial cable 35 connects the shield case 13 to the ground pattern 21 on the printed board 11. The length of the conductive supporting member 31 defines a distance between the antenna member 15 and the recessed surface 27. The feeding member 33 is substantially short of the length of the conductive supporting member 31.

The above-described portable radio communication apparatus has a problem as described in the preamble.

Figure 2:
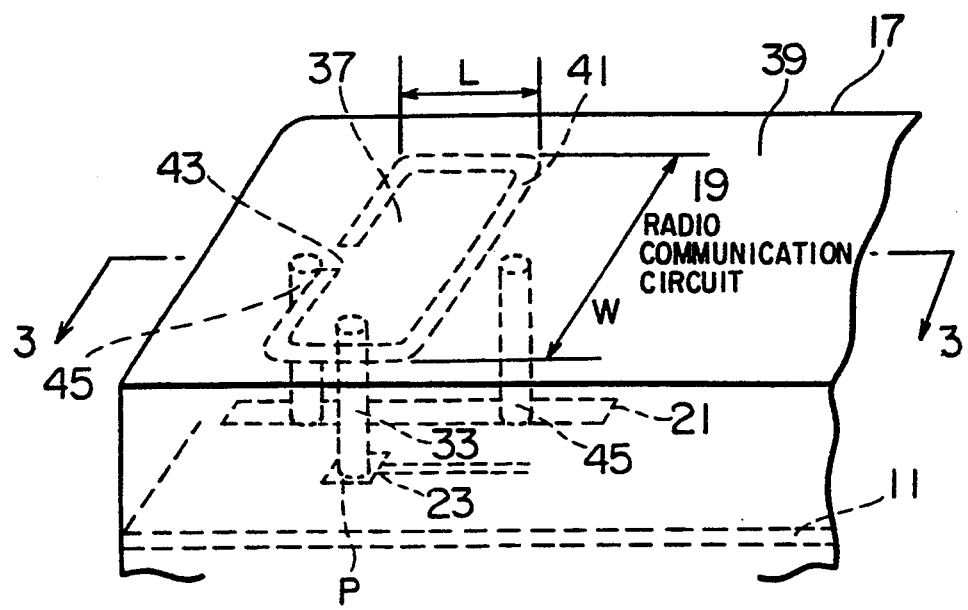
FIG. 2 is a partial perspective view of a portable radio communication apparatus according to an embodiment of this invention.
Figure 3:
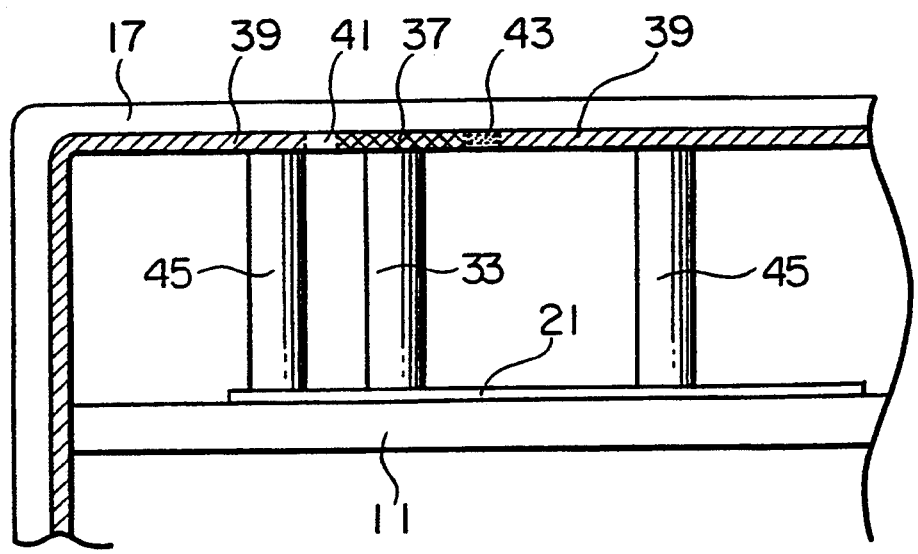
FIG. 3 is a partial sectional view taken substantially along the line 3—3 in FIG. 2.

Referring to FIGS. 2 and 3, description will proceed to a portable radio communication apparatus according to an embodiment of this invention. The illustrated portable radio communication apparatus comprises a printed board 11, an antenna of a conductive film 37, and an insulating case 17. The insulating case 17 contains the printed board 11 and has an inner surface that is opposed to the printed board 11 with a space provided in-between as shown in FIG 2. The printed board 11 has a radio communication circuit 19 including a ground pattern 21 and an antenna terminal pad 23. The antenna film 37 has a length L and a width W and is coated on a predetermined region of the inner surface of the insulating case 17. The resonance frequency is determined by adjusting the length L and the width W of the antenna film 37. A conductive ground film 39 is coated on the remaining region of the inner surface of the insulating case 17 with a constant gap 41 from the outer periphery of the antenna film 37. In detail, the antenna film 37 is surrounded by the conductive ground film 39 with the constant gap 41. A first conductive member 43 is a conductive film formed at a part of the constant gap 41 and connects electrically and bridges the antenna film 37 with the conductive ground film 39. The width of the first conductive film 43 is smaller than the width of the antenna member 15. Each of the antenna film 37, the conductive ground film 39, and the first conductive film 43 is formed by evaporating or painting the conductive material, such as copper or aluminium, on the inner surface of the insulating case 17. A plurality of second conductive members 45 are connected with the conductive ground film 39. The second conductive members 45 are conductive rods each having opposite ends fixedly connected to the conductive ground film 39 and the ground pattern 21, respectively. A feeding member 33 is a conductive rod and has opposite ends fixedly connected to the antenna film 37 and the antenna terminal pad 23, respectively. A desired standing wave ratio is determined by adjusting the distance between the first conductive member 43 and the feeding member 33. The connecting position at which the antenna film 37 and the feeding member 33 are connected is determined by the distance.

As apparent from FIG. 3, because the first conductive ground film 39 which is coated on the insulating case 17 functions as an electromagnetic shield, the shield case 13 illustrated in FIG. 1 is useless. Thus, no clearance is necessary between the first conductive ground film 39 and the insulating case 17, so that the portable radio communication apparatus is produced with a small size and a reduced cost.

What is claimed is:

1. A portable radio communication apparatus, comprising:
   an antenna,
   an insulating case, and
   a printed board having first and second opposed surfaces and a radio communication circuit including a ground pattern and a feeding point, said printed board disposed in said insulating case, and said insulating case having an inner surface opposed to and separated from one of said first and second opposed surfaces of said printed board to define a space therebetween,
   wherein said antenna is a conductive film coated on first predetermined region of said inner surface of said insulating case;
   a conductive ground film coated on a second region of the inner surface of said insulating case, other than said first predetermined region but coplanar with said first region, said conductive ground film surrounding said antenna conductive film such that a C-shaped slot having a constant width is formed and defined between said antenna conductive film and said conductive ground film;
   a first conductive member connecting said antenna conductive film with said conductive ground film;
   a plurality of second conductive members extending within said space and connecting said conductive ground film with said ground pattern of said radio communication circuit; and
   a feeding member extending within said space and connecting said antenna conductive film with said feeding point of said radio communication circuit.

2. A portable radio communication apparatus as claimed in claim 1, wherein each of said second conductive members is a conductive rod, said conductive rod having opposite ends fixedly connected to said conductive ground film and said ground pattern, respectively.

3. A portable radio communication apparatus as claimed in claim 1, wherein said feeding member is a conductive rod, said conductive rod having opposite ends fixedly connected to said antenna conductive film and said feeding point, respectively.

4. A portable radio communication apparatus as claimed in claim 1, wherein said first conductive member is a film.

* * * * *